(12) United States Patent
Pitchumani et al.

(10) Patent No.: US 11,507,314 B2
(45) Date of Patent: Nov. 22, 2022

(54) SYSTEMS AND METHODS FOR MESSAGE QUEUE STORAGE

(71) Applicant: SAMSUNG ELECTRONICS CO., LTD., Suwon-si (KR)

(72) Inventors: Rekha Pitchumani, Oak Hill, VA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/985,145

(22) Filed: Aug. 4, 2020

(65) Prior Publication Data

US 2021/0405926 A1 Dec. 30, 2021

Related U.S. Application Data

(60) Provisional application No. 63/043,678, filed on Jun. 24, 2020.

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0652* (2013.01); *G06F 3/0679* (2013.01); *G06F 13/1668* (2013.01)

(58) Field of Classification Search
CPC .... G06F 3/0659; G06F 3/0604; G06F 3/0652; G06F 3/0679; G06F 13/1668
See application file for complete search history.

(56) References Cited

U.S. PATENT DOCUMENTS

| | | | | |
|---|---|---|---|---|
| 8,458,051 | B1* | 6/2013 | Saltzman | G06Q 20/02 705/26.7 |
| 2006/0122882 | A1* | 6/2006 | Brown | G06Q 30/04 705/14.42 |
| 2010/0017441 | A1* | 1/2010 | Todd | G06F 9/546 705/7.28 |
| 2010/0070588 | A1* | 3/2010 | Sinn | H04L 51/04 709/206 |
| 2018/0246833 | A1* | 8/2018 | Bai | G06F 11/203 |
| 2018/0324129 | A1* | 11/2018 | Varadarajan | H04L 47/50 |
| 2019/0104179 | A1 | 4/2019 | Falco et al. | |

(Continued)

FOREIGN PATENT DOCUMENTS

| | | |
|---|---|---|
| WO | WO 2018/149479 A1 | 8/2018 |
| WO | WO 2018/156788 A1 | 8/2018 |

*Primary Examiner* — Ramon A. Mercado
(74) *Attorney, Agent, or Firm* — Lewis Roca Rothgerber Christie LLP

(57) ABSTRACT

A message queue storage device includes: a non-volatile flash memory unit including one or more flash memory dies including one or more pages grouped into one or more flash blocks; a volatile memory; a data port; and a storage controller configured to: receive, via the data port, a message write command including a message and a queue identifier; identify a queue from one or more queues based on the queue identifier; determine that the message is a persistent message; select a write physical location in one or more pages of the flash memory dies in which to store the message; and store the message associated with the queue at the write physical location in the one or more pages of the non-volatile flash memory unit.

21 Claims, 9 Drawing Sheets

(56) References Cited

U.S. PATENT DOCUMENTS

| | | |
|---|---|---|
| 2019/0171620 A1 | 6/2019 | McCollum et al. |
| 2021/0021442 A1* | 1/2021 | Zhou ................ H04L 12/40026 |
| 2021/0026558 A1* | 1/2021 | Zhang ................ G06F 3/0656 |
| 2021/0243168 A1* | 8/2021 | Giblin ................ H04L 63/105 |
| 2021/0288970 A1* | 9/2021 | Chawla ................ H04L 67/26 |

* cited by examiner

SYSTEMS AND METHODS FOR MESSAGE QUEUE STORAGE

CROSS-REFERENCE TO RELATED APPLICATION(S)

This application claims priority to and the benefit of U.S. Provisional Patent Application No. 63/043,678, filed in the United States Patent and Trademark Office on Jun. 24, 2020, the entire disclosure of which is incorporated by reference herein.

FIELD

Aspects of embodiments of the present disclosure relate to systems and methods for message queue storage.

BACKGROUND

In various computing systems, such as distributed computing systems, different components or portions of the computing systems may communicate with one another using messages. Use of message-based (or stream-based) communication within the computing system enables asynchronous inter-process communication, where producers of the messages can publish messages onto one or more queues, and consumers of the messages can read the messages from the one or more queues as needed, further enabling substantially multicast communication.

SUMMARY

Aspects of embodiments of the present disclosure relate to devices and interfaces for message queue (or publish-subscribe messaging) memory/storage. Some aspects of embodiments of the present disclosure relate to devices and interfaces that are suitable for use in messaging service systems and replacements for worker server nodes, such that manager server nodes, message publishers (or producers), and/or message subscribers (or consumers) may communicate directly with memory/storage devices according to embodiments of the present disclosure.

Aspects of embodiments of the present disclosure relate to a message queue or publish-subscribe message storage device and interfaces for interacting therewith. Devices in accordance with some embodiments of the present disclosure provide an interface by which higher-level service management systems can store messages and retrieve those messages from the device in accordance with message passing protocol semantics, such as publish-subscribe and other queue-based messaging models.

Devices in accordance with some embodiments of the present disclosure may serve as a replacement for the worker nodes in a distributed messaging service system. In more detail, some aspects of embodiments of the present disclosure relate to a specialized storage device (e.g., solid-state data storage device or a flash-based data storage device) having an interface that natively provides operations at the queue and message level, rather than at the block level. Accordingly, some aspects of embodiments of the present disclosure enable manager nodes to interact directly with the storage devices, such as through a network adapter integrated into devices in accordance with embodiments of the present disclosure (e.g., over networking fabrics such as Ethernet, Fibre Channel, InfiniBand, and the like). Some aspects of embodiments of the present disclosure enable the offloading of queue management operations from general purpose host computing systems to directly connected devices, thereby freeing the processing capabilities of the host computing system for other uses (e.g., performing different functions or supporting additional storage). Accordingly, specialized devices in accordance with embodiments of the present disclosure may reduce energy consumption and hardware costs in comparison to other techniques that implement storage nodes using general purpose computing systems.

Some aspects of embodiments of the present disclosure relate to storing messages and queues within the flash memory in accordance with the underlying hardware characteristics of the solid-state memory and the access patterns of message queue systems, rather than in accordance with block-level storage. Comparative systems may use a general-purpose block level interfaces or approaches to storage, which may not account for the access patterns of messaging service systems. By storing the data in the cells of flash memory devices in accordance with the access patterns of messaging services, embodiments of the present disclosure to improve the performance and longevity of such storage devices, such as by grouping messages in accordance with predicted read times and to make garbage collection more efficient.

According to one embodiment of the present disclosure, a message queue storage device includes: a non-volatile flash memory unit including one or more flash memory dies including one or more pages grouped into one or more flash blocks; a volatile memory; a data port; and a storage controller configured to: receive, via the data port, a message write command including a message and a queue identifier; identify a queue from one or more queues based on the queue identifier; determine that the message is a persistent message; select a write physical location in one or more pages of the flash memory dies in which to store the message; and store the message associated with the queue at the write physical location in the one or more pages of the non-volatile flash memory unit.

The message queue storage device may further include a storage processing unit configured to perform computations based on the message.

The data port may be a component of a network adapter.

The queue may have a message lifetime that is applied to messages associated with the queue, and the storage controller may be configured to compute an expiration time for the message in the queue.

The storage controller may be configured to select the one or more pages of the flash memory dies based on an expiration time of a message stored in a same flash block as the one or more pages.

The storage controller may be further configured to perform garbage collection on a flash block based on determining that all messages stored in the flash block are marked as expired.

The message write command may include a publisher identifier, and the storage controller may be further configured to authenticate a publisher associated with the publisher identifier.

The storage controller may be further configured to: receive a request to subscribe to the queue; and add a subscriber to the queue.

The request may include a subscriber identifier, and the storage controller may be further configured to authenticate a subscriber associated with the subscriber identifier.

The storage controller may be further configured to, send an alert to the subscriber in response to adding the message to the queue.

The storage controller may be further configured to send the message to the subscriber in response to adding the message to the queue.

The storage controller may be configured to: receive a message read command including a queue identifier and subscriber identifier; identify a read queue from the one or more queues based on the queue identifier; identify a read physical location of a next message in the read queue; read a stored message at the read physical location in the pages of the flash memory dies; and send the stored message to a subscriber associated with the subscriber identifier.

The storage controller may maintain a cursor associated with the subscriber identifier and the queue.

The storage controller may be configured to identify the read physical location of a next message in the queue by: determining a current position of the cursor associated with the subscriber identifier; determining a message identifier associated with the current position of the cursor; and determining the read physical location based on the message identifier.

The storage controller may be further configured to: receive an acknowledgement from the subscriber; and update a position of the cursor in the queue based on the acknowledgement from the subscriber.

The storage controller may be further configured to mark a message as expired in response to determining that all cursors have moved past the message.

The storage controller may provide a Non-Volatile Memory express (NVMe) interface for controlling the message queue storage device via the data port.

According to one embodiment of the present disclosure, an interface for a flash storage controller including a flash translation logic configured to translate from a queue identifier and a message to a physical location in flash memory includes providing: a message write command including a first queue identifier and a first message, the message write command controlling the flash storage controller to store the first message, associated with a first queue identified by the first queue identifier, in the flash memory; and a message read command including a second queue identifier and a subscriber identifier, the message read command controlling the flash storage controller to read a second message, associated with a second queue identified by the second queue identifier, stored in the flash memory and a position in the second queue associated with the subscriber identifier.

The interface may further provide a create queue command to control the flash storage controller to create a third queue for providing access to messages published to the third queue in a first-in-first-out order.

The create queue command may configure the flash storage controller to: assign a message lifetime to a third message published to the third queue; and mark the third message as expired based on the message lifetime of the third message.

The interface may further provide a subscribe command including a fourth queue identifier and a subscriber identifier, the subscribe command controlling the flash storage controller to subscribe the subscriber identifier to a fourth queue associated with the fourth queue identifier.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
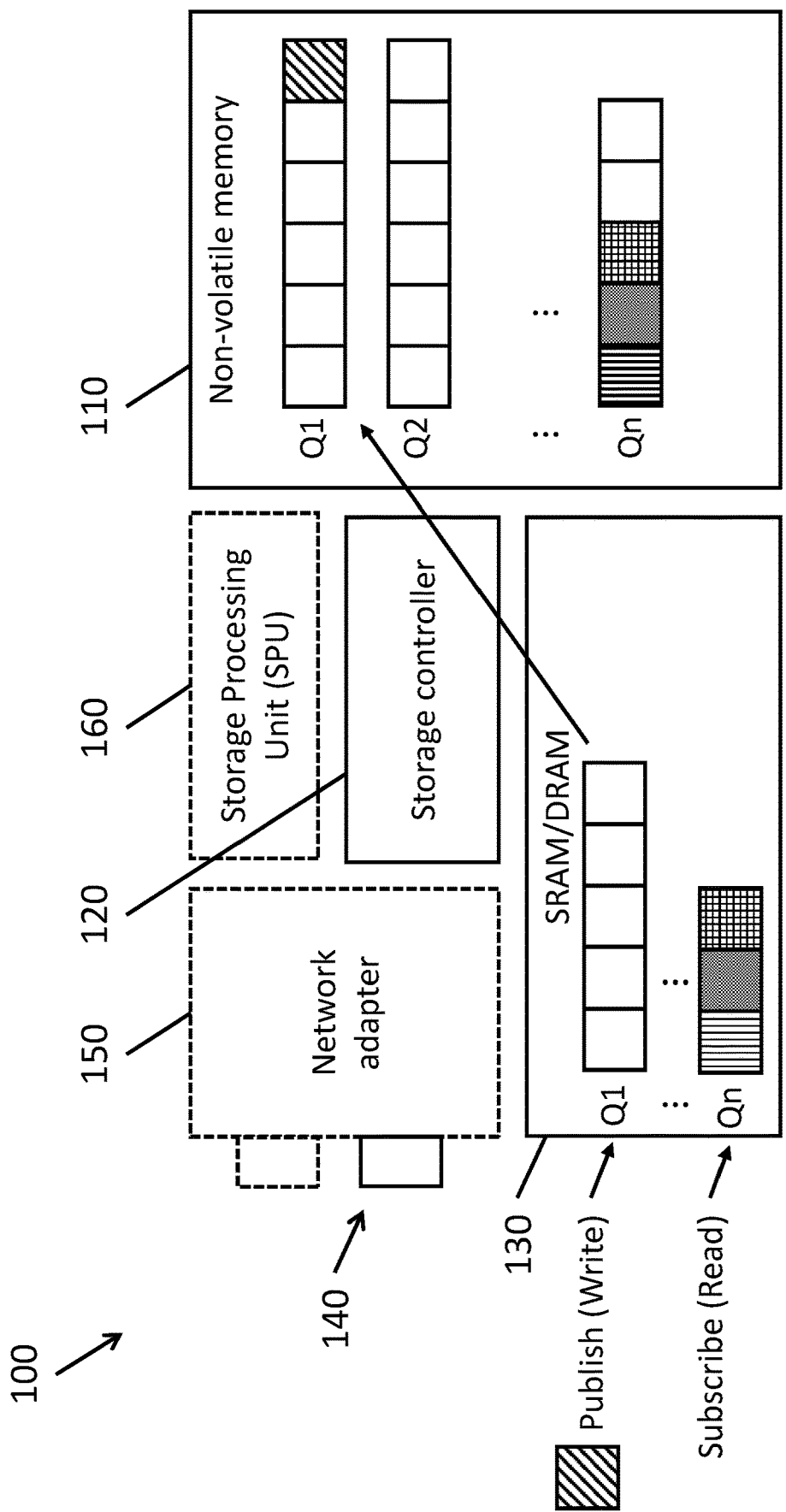
FIG. 1 is a schematic diagram of a message queue storage device according to some embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As noted in the background, message-based (or stream-based) communication within computing systems enables asynchronous inter-process communication, such as between processes within a single machine or between processes running on different machines, where producers of the messages can publish messages onto one or more queues, and consumers of the messages can read the messages from the one or more queues as needed, further enabling substantially multicast communication. One use case of such messaging service systems or message brokers using the queues as buffers, such that the queues absorb spikes in the generation of messages from producers, thereby smoothing the workload at the consumers. As one example, user interactions with a website may generate events that are pushed onto a queue, and an analytics system may periodically consume messages from the queue, in batches that span various time windows, in order to generate statistical information regarding each batch of data. When activity on the website is high, events may be generated more quickly than can be processed by the analytics systems. However, a message queue can durably store the events during the spike in traffic while the analytics system catches up with the workload.

Multiple enterprise message-oriented durable event (or message) ingestion and delivery software systems or message brokers exist in the market to meet user needs. These software systems typically provide many-to-many asynchronous messaging with a message queue or Publisher-Subscriber (or publish-subscribe or pub-sub) interface, where a producer may publish messages onto one or more queues, and each of the queues may have one or more subscribers that can read the messages from subscribed queues.

Many of these software systems support persistent and non-persistent messaging. Persistent messaging refers to the storage of the messages in non-volatile memory such as flash memory (such as NAND flash memory where the memory cells using transistors that are connected in a way that resembles NOT-AND (NAND) gates), hard disk drives, and the like, and non-persistent messaging refers to the storage of messaging in volatile memory such as dynamic random-access memory (DRAM). These messaging service systems are typically deployed on multiple worker server nodes that store and retrieve persistent messages on block storage devices attached to the server nodes. The worker server nodes may be coordinated by one or more manager server nodes to provide a messaging service with additional features over the services provided by individual worker nodes, such as sharing the messaging workload across multiple worker nodes and replicating data among multiple worker nodes to provide fault-tolerance and durable delivery in the event of failure of one or more of the worker nodes.

As noted above, aspects of embodiments of the present disclosure relate to specialized message queue (or publish-subscribe message) storage devices that provide a queue-based interface in contrast to a block-level interface of comparative storage devices. The terms "message queue" and "publish-subscribe" will be used herein, but embodiments of the present disclosure are not limited to publish-subscribe access models in particular, but may be used in other queue-based messaging applications.

Generally, a distributed messaging service system includes worker nodes and manager nodes. In these comparative systems, the worker nodes are general-purpose computer systems (e.g., physical machines or virtual machines and/or containerized systems running on physical machines) that are connected to or include storage devices such as solid-state drives (SSDs), which are connected as block storage devices. These general-purpose computer systems are configured, using software, to provide message storage services via the manager nodes. Accordingly, worker nodes generally have high resource utilization due to the server footprint of running a complete computer system (e.g., with a full operating system stack) to provide access to connected storage devices. A traditional storage device such as a solid-state drive (SSD) may manage the storage of user data in response to write requests and the retrieval of data in accordance with read requests in a "block-level" data storage, where each block is a sequence of bytes or bits having some maximum length (a "block size"). The blocks are general-purpose, and the block sizes are generally independent of the semantics of the data being stored. For example, writing data smaller than a block may cause the data to be written to occupy only a portion of a block, and writing data larger than a block will result in the data being divided into multiple blocks. As another example, data may be written to locations in the SSD in accordance with device-level considerations, such as wear-leveling and available pages, without considering characteristics of the underlying data.

By providing a message-level and/or queue-level interface, embodiments of the present disclosure can operate as worker nodes or message brokers in a distributed messaging service system. As discussed in more detail below, internal controllers of devices in accordance with embodiments of the present disclosure manage the storage, distribution and delivery of user messages (data) in queues or topics, as well as the management of publishers and subscribers to the queues or topics. As such, specialized hardware in accordance with embodiments of the present disclosure may have reduced size, power requirements, and computing overhead, and therefore may reduce costs (e.g., in terms of server hardware costs, energy costs, and/or cloud computing costs) for operators of such messaging service systems in comparison to using general-purpose computing systems as worker nodes.

FIG. 1 is a schematic diagram of a message queue storage device according to some embodiments of the present disclosure. As shown in FIG. 1, a message queue storage device 100 includes a non-volatile memory, depicted in FIG. 1 as flash memory. The non-volatile memory 110 may store data representing messages of one or more queues. FIG. 1 depicts n queues, labeled Q1, Q2, . . . , Qn. In embodiments where the non-volatile memory 110 is flash memory, the flash memory may include multiple dies or chips. As shown in FIG. 1, a storage controller (or flash controller or non-volatile memory express (NVMe) controller) 120 is configured to control a manage the non-volatile memory 110. In some embodiments, the storage controller 120 includes a flash translation logic (FTL) for translating requests to read and write data (e.g., in accordance with messages and associated queues) to the non-volatile memory 110 (e.g., in accordance with cells, pages, and blocks or "erase blocks" of flash memory). In various embodiments of the present disclosure, the storage controller 120 may include, for example, a processor and a memory (e.g., a microcontroller), an application specific integrated circuit (ASIC), a field programmable gate array (FPGA), and the like, or other processing circuit configured to store data in the non-volatile memory 110 and to retrieve data therefrom in response to commands received from an external source. The storage controller 120 may include internal persistent memory (e.g., additional, separate non-volatile memory) of its own in order to store metadata such as the physical locations of the data stored in the non-volatile memory 110, configuration parameters, publisher and subscriber authentication information, and the like. In some embodiments, storage controller 120 stores some or all of the metadata on in the non-volatile memory 110.

Figure 2:
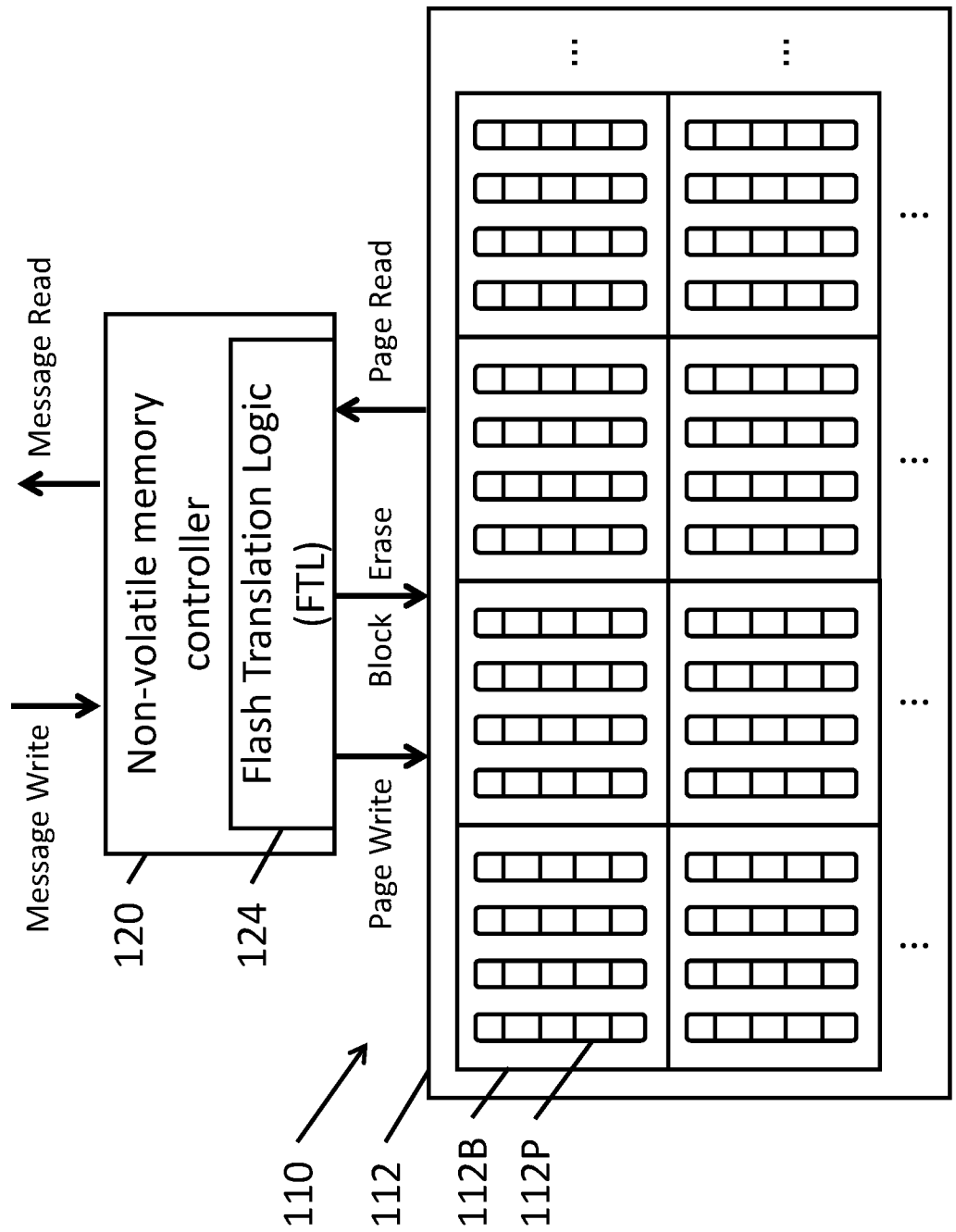
FIG. 2 is a schematic diagram of a storage controller including a flash translation logic and a non-volatile memory module of a message queue storage device according to one embodiment of the present invention where the non-volatile memory is implemented as NAND flash.

FIG. 2 is a schematic diagram of storage controller including a flash translation logic and a non-volatile memory module of a message queue storage device according to one embodiment of the present invention where the non-volatile memory 110 is implemented as flash memory. As shown in FIG. 2, a flash memory storage module 112 of the non-volatile memory 110 includes pages 112P of data that are organized into blocks 112B, where each block includes a plurality of pages. To reduce confusion with the term "block" as used to refer to block-level storage devices, a block 112B of pages 112P may be referred to herein and a "flash block" or as an "erase block." Due to implementation details of flash memory storage technologies, data can typically be read and written on a per-page basis, but erasing data is performed on a per-erase block basis. The flash translation logic 124 of the storage controller 120 translates between logical writes and reads and implementation-specific write and read commands (e.g., page writes, flash block erases, and page reads). In a comparative logical block mode of accessing a storage device, the logical sectors may be, for example, 512 bytes in size. In some comparative flash memory devices (e.g., solid state drives), each page may have a size of 4 KiB, and each flash block or erase block may have a size of 4 MiB.

In solid state drives (SSDs) that use flash memory (and also other devices that perform garbage collection), the flash memory is usually organized into erase blocks containing multiple pages. Each page may be in one of three states: free (currently not storing any data), valid (currently storing data), and invalid (previously storing valid data, but no longer storing valid data and not yet free).

When new data is written to the flash memory, a free page 112P is located and the data written to that free page. The page is then marked as storing valid data. Flash memory usually may be written to once at the page level (e.g., on a page-by-page basis), and cannot be overwritten at the page level. Therefore, when data stored in flash memory is to be changed by an application, the entire page containing the data is written to a new page in flash memory. The original page is then marked as invalid. Garbage collection is the process by which the flash memory reclaims invalid pages at the granularity of erase blocks (or "blocks").

When a flash block or erase block is subjected to garbage collection, any currently valid data in the flash block must be copied ("programmed") to a free page in some other flash block of the flash memory before the pages in the current flash block may be erased or garbage collected (e.g., before every page in the erased flash block is put in the free state). If garbage collection were initiated as soon as any data in the flash block were invalidated, the SSD would spend a significant amount of time moving data from valid pages in the flash block to other flash blocks. This movement of valid data within the flash memory may add significant overhead by itself. In addition, flash memory typically may be written to only a finite number of times before the memory becomes unreliable (or worse, unusable). Therefore, it is desirable to reduce or minimize the amount of time spent programming valid data from an erase block. On the other hand, garbage collection may not be deferred until every page in an erase block is marked invalid: the flash memory might end up with every flash block containing only pages marked valid or invalid (that is, no free pages), which would mean no further data could be written to the flash memory.

As noted above, some aspects of embodiments of the present disclosure relate to a storage controller 120 and a flash translation logic 124 that provide a logical message mode of accessing the storage device, where the flash translation logic 124 stores messages in the pages of the flash storage module 112 in accordance with message access patterns and message metadata, as will be described in more detail below.

Referring back to FIG. 1, the storage controller 120 may also be connected to volatile memory 130 such as dynamic random-access memory (DRAM) or static random-access memory (SRAM). The volatile memory 130 may operate as, for example, a buffer for storing messages when first received by the message queue storage device 100 and as a cache for storing messages that may be requested soon. The volatile memory 130 may also store state information such as queue management information, as discussed in more detail below.

According to some embodiments of the present disclosure, the message queue storage device 100 further includes one or more data ports 140 for interfacing with external devices. For example, in some embodiments, the data ports 140 may correspond to Non-Volatile Memory Express (NVMe) connections or Peripheral Component Interconnect Express (PCIe) connections for interfacing with a host computing system (e.g., a computer system including a processor, memory, and communication bus for connecting to the data ports 140), in which case the host computing system can offload various message and queue management operations to devices in accordance with embodiments of the present disclosure. In some embodiments, the data ports may be components of a network adapter 150, and the data ports may correspond to Ethernet ports or other network ports for connecting to a computer network (e.g., an Ethernet network connection or a switched fabric), in which case manager nodes or other users of worker node storage capabilities can communicate directly with devices in accordance with embodiments of the present disclosure over the computer network.

Publish-Subscribe Services

Figure 3A:
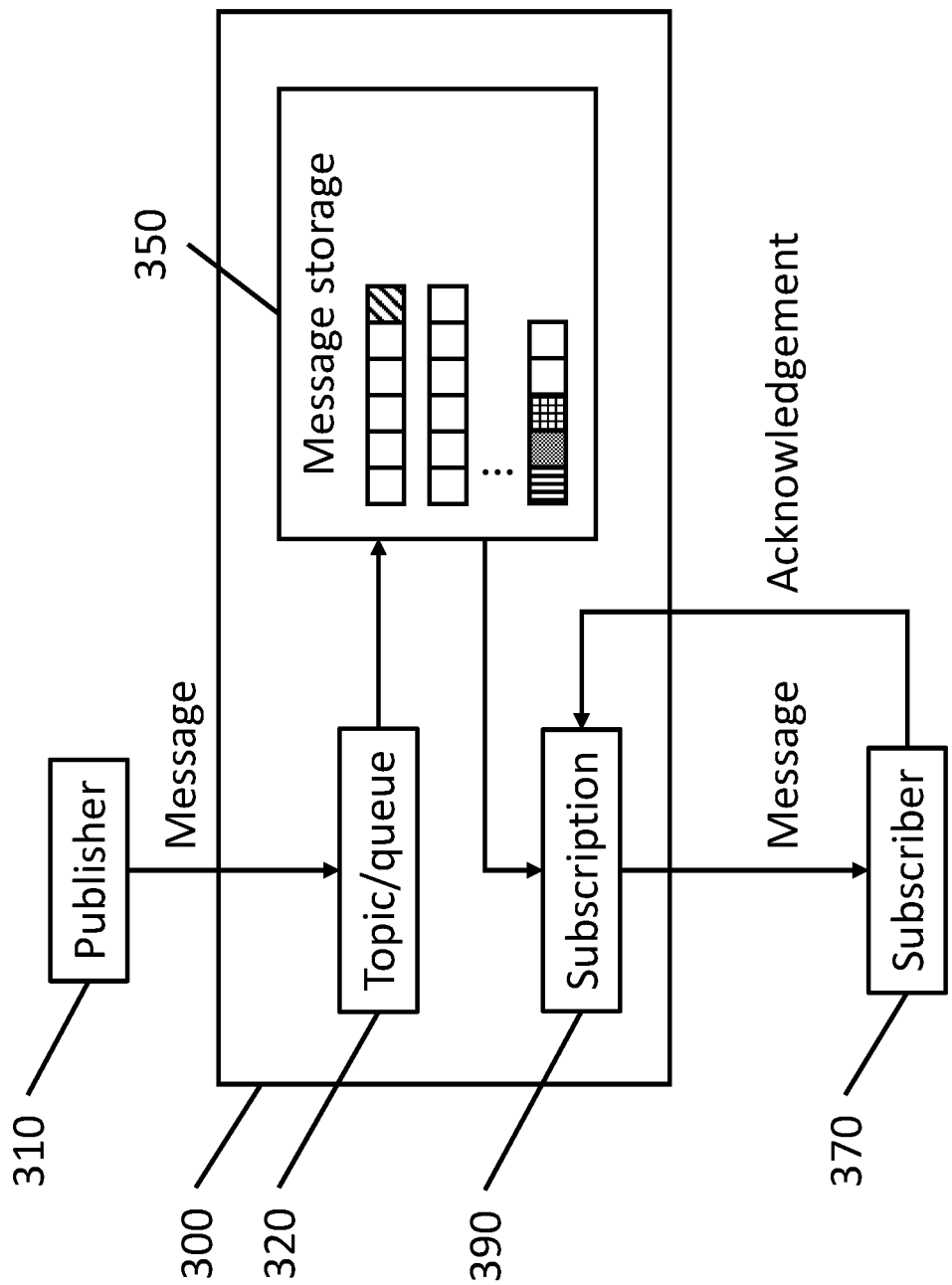
FIG. 3A is a schematic diagram of a message queue communication pattern in which embodiments of the present disclosure may be used.

FIG. 3A is a schematic diagram of a message queue communication pattern in which embodiments of the present disclosure may be used. In more detail, as shown in FIG. 3A, in a queue-based messaging service such as a publish-subscribe messaging service 300, a publisher 310 generates a message to be published. The message may be specific to the application in which the queue-based messaging service is used, and may include, for example, information regarding events (e.g., a command supplied by a user through a website to initiate a transaction, an alert generated by a hardware device regarding current self-diagnostic results, an event triggered by an external condition such as current electricity prices exceeding a threshold, or the like). The message is published to a particular topic or queue 320 and the message may be stored in a message store 350. Each topic or queue 320 may be associated with one or more subscribers 370, where each subscriber may be associated with a subscription 390 to a corresponding one of the one or more topics or queues 320. Based on various conditions such as a request from a subscriber for new messages in a "pull" arrangement, or an active transmission from the queue-based messaging service 300 to the subscriber 370 in a "push" arrangement, the queue-based messaging service transmits messages from subscribed topics 320 to subscribers 370. In some circumstances, the subscriber transmits an acknowledgement to the queue-based messaging service to confirm receipt of the messages.

Figure 3B:
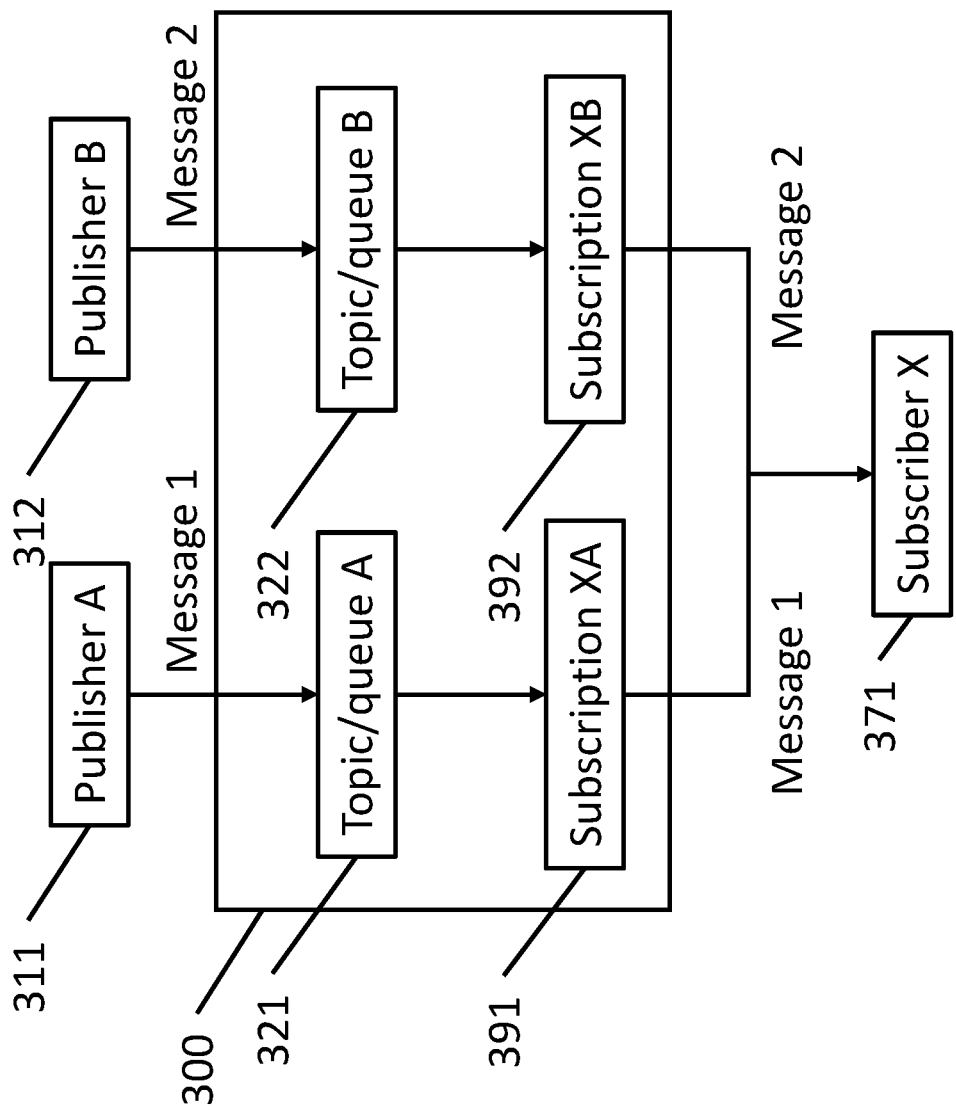
FIG. 3B is a schematic depiction of a message queue communication pattern in which a subscriber is subscribed to more than one topic or queue.

Any given subscriber 370 may have multiple subscriptions 390 to receive messages from different ones of the topics or queues 320. For example, FIG. 3B depicts a circumstance in which subscriber X 371 is subscribed to topic/queue A 321 via subscription XA 391 and also subscribed to topic/queue B 322 via subscription XB 392. When publisher A 311 published message 1 to topic/queue A 321, subscriber X 371 receives message 1 through subscription XA 391. Likewise, when publisher B 312 publishes message 2 to topic/queue B 322, subscriber X 371 receives message 2 through subscription XB 392.

Figure 3C:
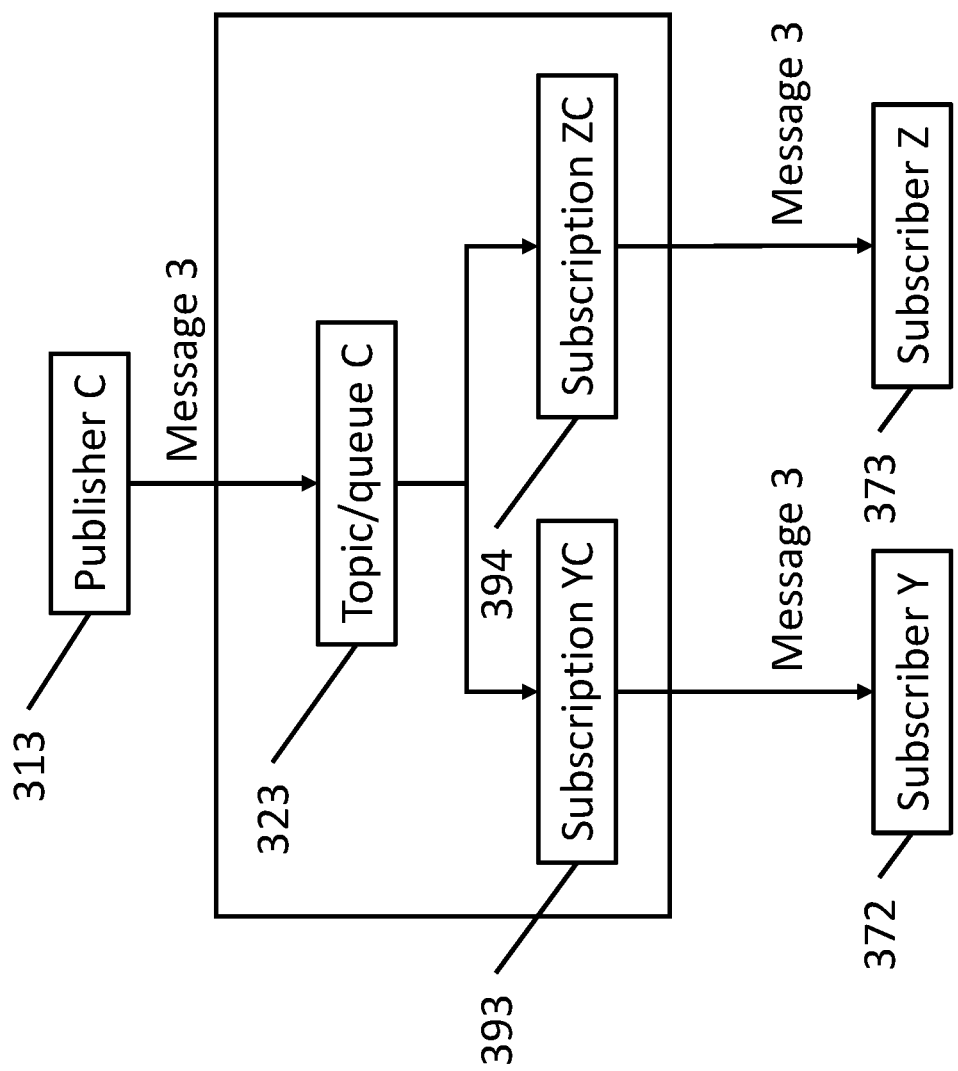
FIG. 3C is a schematic depiction of a message queue communication pattern in which a topic or queue has more than one subscriber.

Likewise, any given topic or queue may have multiple subscribers. For example, FIG. 3C depicts a circumstance where subscriber Y 372 and subscriber Z 373 are both subscribed to topic or queue C 323 via respective subscriptions YC 393 and ZC 394. When publisher C 313 publishes message 3 to topic or queue C 3232 both subscriber Y 372 and subscriber Z 373 receive message 3 through their respective subscriptions.

A queue-based message storage device according to embodiments of the present disclosure may be used as a component of the message store 350. In particular, the queue-based messaging service 300 may include worker nodes configured to store messages, where one or more of the worker nodes may be implemented using one or more message queue storage devices according to embodiments of the present disclosure, and may be coordinated by one or more manager nodes to provide, as discussed above, worker node management such as durable delivery, fault tolerance, failover, and the like.

The topic or queue 320 generally handles the messages in a first-in-first-out (FIFO) manner, where earlier-published messages are transmitted to subscribers before later-published messages. In other words, the order in which the messages are published to a given topic or queue 320 is preserved when transmitted to the subscribers 370 of the topic.

Figure 4A:
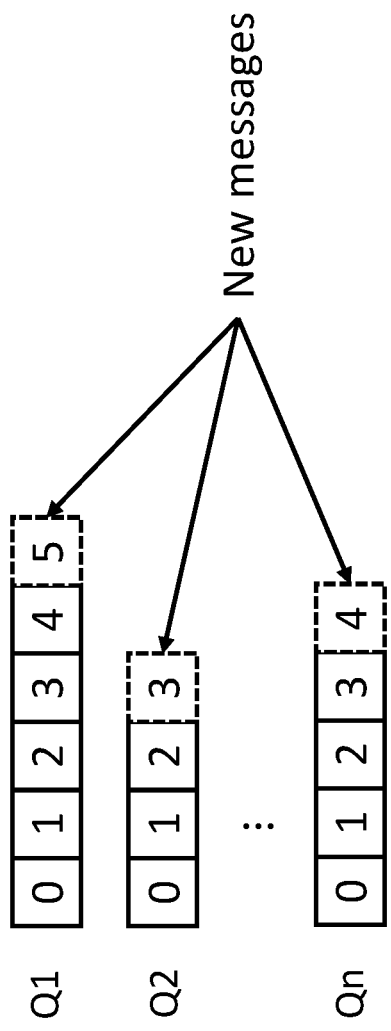
FIGS. 4A and 4B are schematic depictions of writing messages to topics or queues and reading messages therefrom.
Figure 4B:
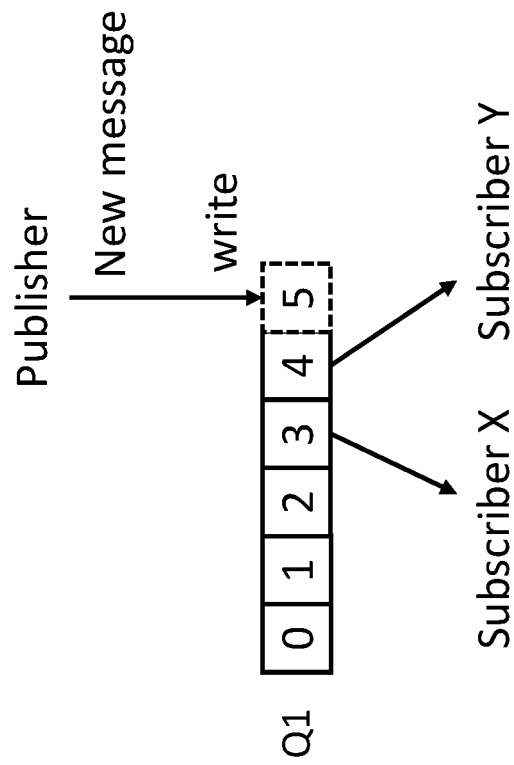

FIGS. 4A and 4B are schematic depictions of writing messages to topics or queues and reading messages therefrom. As shown in FIG. 4A, when new messages are written to one or more queues or topics, the messages are added to the end of the queues, where the empty slots at the ends of the queues are shown with dotted lines. The messages in the queues may be numbered sequentially or occupy indexed positions in the order in which the messages were added to the queue, such that the message at the head of the queue has the lowest number and newly added messages have the highest number. As messages are removed from the queue (e.g., through expiration), the indices of the remaining messages may be updated accordingly.

FIG. 4B is a schematic depiction of writing to queues and reading from queues. As shown in FIG. 4B, a producer may write a new message at the end of the queue, at position 5. Subscriber X and Subscriber Y may read from the queue. In the example shown in FIG. 4B, subscriber X has already received the messages at positions 0, 1, and 2, and therefore is currently reading or receiving its next unseen message, stored at position 3. On the other hand, in the example shown, subscriber Y has already received messages 0, 1, 2, and 3, and therefore it is currently reading or receiving the message stored at position 4.

Accordingly, aspects of embodiments of the present disclosure relate to message queue storage devices that provide an interface operates at the granularity of queues and messages exchanged in a queue-based messaging system (e.g., publish-subscribe messaging systems), as discussed above, in order to provide reduced overhead and improved performance over performing message storage using comparative general-purpose server-based worker nodes.

Message and Queue Level Commands

As discussed above, a message queue storage device according to various embodiments of the present disclosure is configured to receive commands and data via its data ports 140, where the commands and the data are supplied at the message level instead of at a block level.

For example, a comparative block storage device may receive commands (e.g., requests) to store a block of data at a particular logical address within the storage device (or multiple blocks of data at a particular range of logical addresses) and commands to retrieve the data stored in blocks at particular addresses within the block storage device. In comparative block-level SSDs or block-level flash memory devices, the flash translation logic may be used to translate between the logical block addresses used in the commands into physical addresses (e.g., particular pages 112P and locations within those pages) of the non-volatile memory 110. The flash translation logic maintains a table that maps between the logical addresses and the physical addresses, such that when data is moved between blocks (e.g., during garbage collection), the table is updated so that the same logical addresses can be used to access the data that was moved within the non-volatile memory 110.

As noted above, a message queue storage device in accordance with embodiments of the present disclosure provides an interface that operates at the message and queue level. For example, message write commands may supply a message and a queue to which the message is to be added to (in contrast to specifying a logical address at which a given block of data is to be stored). Likewise, message read commands may identify a subscriber identifier and a read queue (or a queue identifier identifying a read queue) to be read from, such that the earliest message from the read queue that has not yet been delivered to the subscriber is provided to the requester in response. Accordingly, embodiments of the present disclosure enable the offloading of various queue management operations to the storage controller 120 of the message queue storage device 100, thereby freeing computational resources elsewhere.

According to some embodiments of the present disclosure, a message queue storage device 100 provides an interface for creating a queue (or multiple queues) for storing messages. When a storage controller 120 receives a create queue command to create a queue, the storage controller 120 may generate an internal queue identifier and associated the internal queue identifier with an external queue identifier or external topic identifier (e.g., an identifier specified as part of the create queue command to create the queue or topic) by storing a mapping from the external topic or queue identifier to the internal queue identifier in a queue identifier association table (e.g., a hash table or other key-value data structure). The storage controller 120 may also allocate a data structure for managing internal addresses of messages stored in the non-volatile memory 110 (e.g., locations of messages within the pages 112P of the non-volatile memory).

In some embodiments of the present disclosure, each queue is associated with one or more queue configuration parameters, which are also maintained by the storage controller 120. These queue configuration parameters may include, for example, the type of the message in the queue (e.g., blobs or key-value messages), message lifetime parameters for the messages stored in that queue (e.g., how long each message will be kept in the queue, such as a specified length of time in seconds), message persistence parameters (e.g., whether the messages will be stored in persistent non-volatile memory 110 or only in non-persistent volatile memory 130, or combinations thereof based on different conditions), computations that are to be run on the messages in the queue (along with computation specific parameters per queue such as when to run the computation, e.g., to pre-process messages at the time of publishing versus immediately before delivery), and authorized publishers and authorized subscribers of the queue (as discussed in more detail below).

In some embodiments, the message queue storage device may impose numbers and limits on the numbers of active queues. For example, in response to receiving a create queue command to create a new queue, the storage controller 120 may determine that the message queue storage device 100 is already managing the maximum number of queues and may respond that a new queue cannot be created. In some embodiments, the storage controller 120 provides an interface for deleting a queue (e.g., as identified by its external queue identifier).

According to some embodiments of the present disclosure, the message queue storage device 100 provides an interface for registering publishers to particular queues that are managed by the storage controller 120. For example, a publisher may identify themselves using a digital signature or other identifier, where only registered publishers may publish to their associated queues, and where the storage controller 120 verifies that messages received for publication are sent by registered publishers for those queues. In some embodiments of the present disclosure, some queues may be treated as public, in which case any publisher can publish to those queues.

Likewise, according to some embodiments of the present disclosure, the message queue storage device 100 provides an interface for registering subscribers to particular queues that are managed by the storage controller 120. A subscribe command for registering a subscriber to a particular queue may also include configuration parameters for the subscriber, such as whether the storage controller 120 should send the full messages or only alerts to the subscriber when messages are published to the queue, or refrain from sending messages to the subscriber, such that the subscriber merely reads new messages from subscribed queues. A subscribe command for registering subscribers may also include information about how the message queue storage device 100 should communicate with the subscriber, such as a particular IP address and port, a uniform resource identifier (URI), memory address in the case of communication with a directly-connected host, or other communication mechanism.

In some embodiments of the preset disclosure, a further authentication process is used to authenticate a publisher or a subscriber before associating the publisher or subscriber to a queue. Examples of authentication may include public-key and/or symmetric key cryptography-based authentication, username and password-based authentication, and the like.

Figure 5:
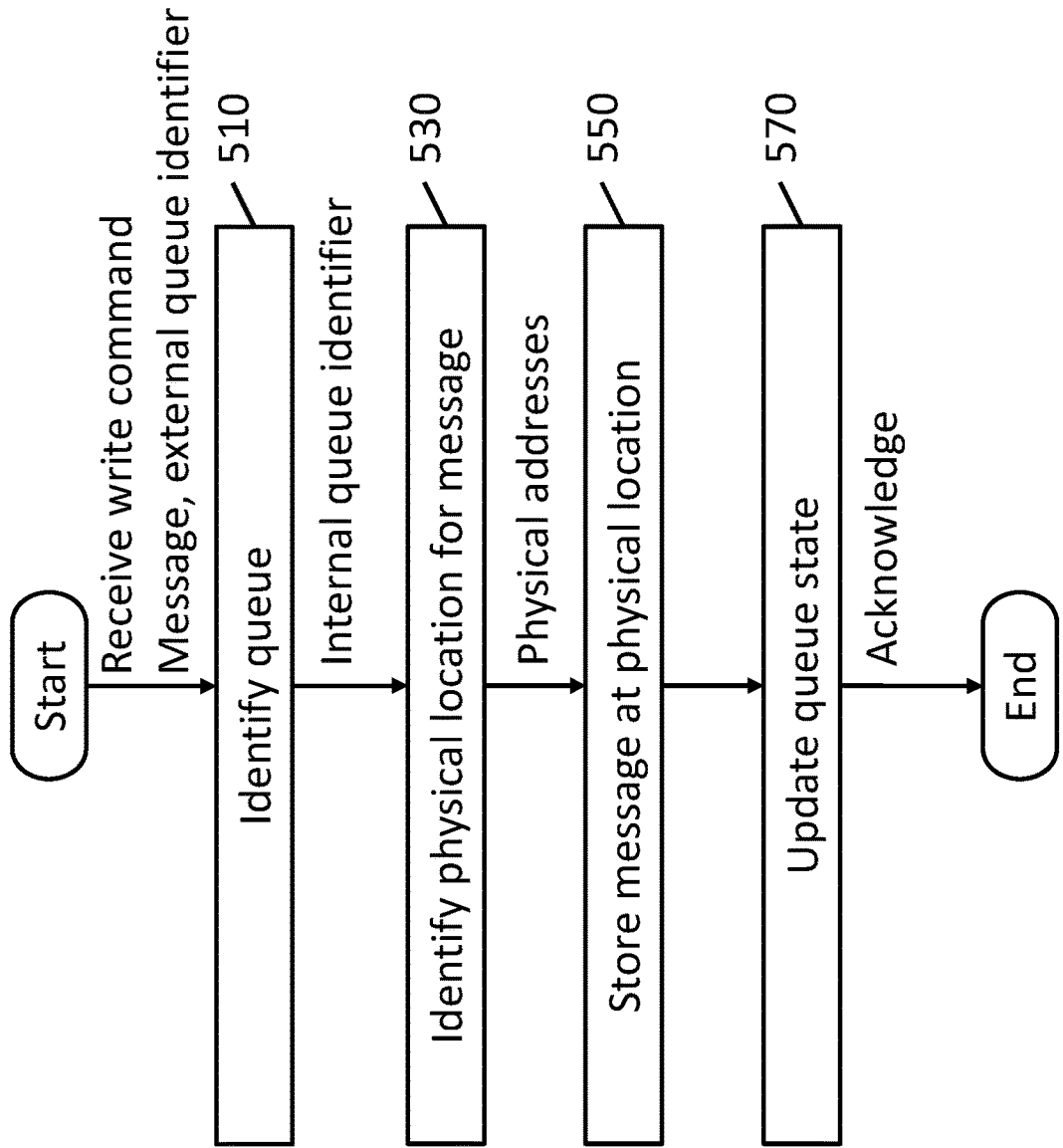
FIG. 5 is a flowchart depicting a method for processing a message write command according to one embodiment of the present disclosure.

FIG. 5 is a flowchart depicting a method for processing a message write command according to one embodiment of the present disclosure. According to some embodiments of the present disclosure, a message queue storage device 100 provides an interface for writing a message to a queue (or publishing a message to a queue or topic) for storing messages in the message queue storage device 100. In some embodiments, a command to write a message to a queue includes a message and a queue identifier (e.g., and external queue identifier). In operation 510, a storage controller 120 identifies a queue associated with the external queue identifier, such as by looking up the internal queue identifier associated with the external queue identifier in the queue identifier association table. In some embodiments, a given message may be published to multiple queues (e.g., the command may include one message and more than one external queue identifier). In some embodiments, a message write command may include multiple messages to be added to one queue. In some embodiments, a message write command may include multiple queue identifiers, where the message (or each message) may be published on one or more queues identified by the queue identifiers.

As noted above, in some embodiments of the present disclosure, the storage controller 120 verifies that the received message was sent by a registered publisher for the identified queue. In some embodiments of the present disclosure, the message write command includes information for authentication of the publisher of the message. Examples of authentication information include a one-time password (e.g., a cryptographically generated, time-based password), a digital signature of the message generated using a cryptographic key associated with the publisher (e.g., a private key of the publisher), or a value generated based on a "challenge" provided by the storage controller 120. In some embodiments, when validation of the message write command fails, the method shown in FIG. 5 terminates without the publishing of the message. In circumstances where validation of the message write command succeeds or where validation is not performed, the storage controller proceeds with operation 530.

In operation 530, the storage controller 120 identifies a write physical location at which to store the message within the message queue storage device 100, such as within the (persistent) non-volatile memory 110 or within the (non-persistent) volatile memory 130. For example, in some cases the identified queue is configured as a non-persistent queue, in which case the message may be stored in the volatile memory 130, whereas in other cases the identified queue is configured as a persistent queue, in which case the message may be stored in the non-volatile memory 110. In some embodiments, the storage controller 120 determines whether to store the message in non-volatile memory 110 or volatile memory 130 based on factors including time since the message was received and consumed, time-to-live settings, user filter functions (e.g., based on user-specified conditions for whether messages should be persistent or non-persistent), and the like. In some embodiments, a queue is configured such that each message is persisted (e.g. stored in the non-volatile memory 110) until all subscribers to the queue have read (or "consumed") that message.

In some embodiments in which the message is stored in non-volatile memory 110, the storage controller 120 stores the message in any available page 112P of the non-volatile memory 110. In some embodiments, the storage controller applies algorithms similar to those used in comparative block storage devices for selecting a location for the message based on, for example, page availability, wear-leveling, and the like. In some embodiments, when the message is smaller than the size of a page 112P, the storage controller 120 temporarily stores or buffers the message in the volatile memory 130 until a sufficient number of messages are received to fill a page.

In some embodiments, messages that are expected to expire at the same time or close in time are grouped together and stored in the same flash block. This enables the flash controller to garbage collect a flash block without copying data from the flash block when all of the messages in the flash block have expired, thereby reducing the amount of internal copying and rewriting of data to other pages of the non-volatile memory 110 for garbage collection, which can improve garbage collection speed (e.g., less time spent copying), reduce energy consumption (fewer cycles spent copying data), and reduce wear (reduced writing of data to empty pages, e.g., reduced write amplification).

Messages may be expected to expire at the same time based on the message lifetimes of messages stored in the queues. In other words, the message lifetime set for a particular queue causes each message added to the queue to be associated with an expiration time. For example, messages intended for a particular queue having a message lifetime setting may be written to a current flash block until the pages of the current flash block are full, at which point another flash block is selected as the current flash block and further messages intended for that queue are written to the newly selected current flash block. Under such an approach, any given flash block corresponds to messages received over a particular window of time (e.g., from the first message written to the flash block until the last message written to the flash block), where the current flash block does not store messages from other queues and does not mix in messages that were published after the first message of another time block corresponding to a different window of time. Accordingly, the messages in a flash block have expiration times spanning an expiration time window, and after the last message of the current flash block has expired (e.g., the message having the latest expiration time), all of the other messages have also expired (e.g., because they had earlier expiration times) and therefore the entire flash block can be garbage collected without needing to copy messages to the pages of other flash blocks.

Figure 6:
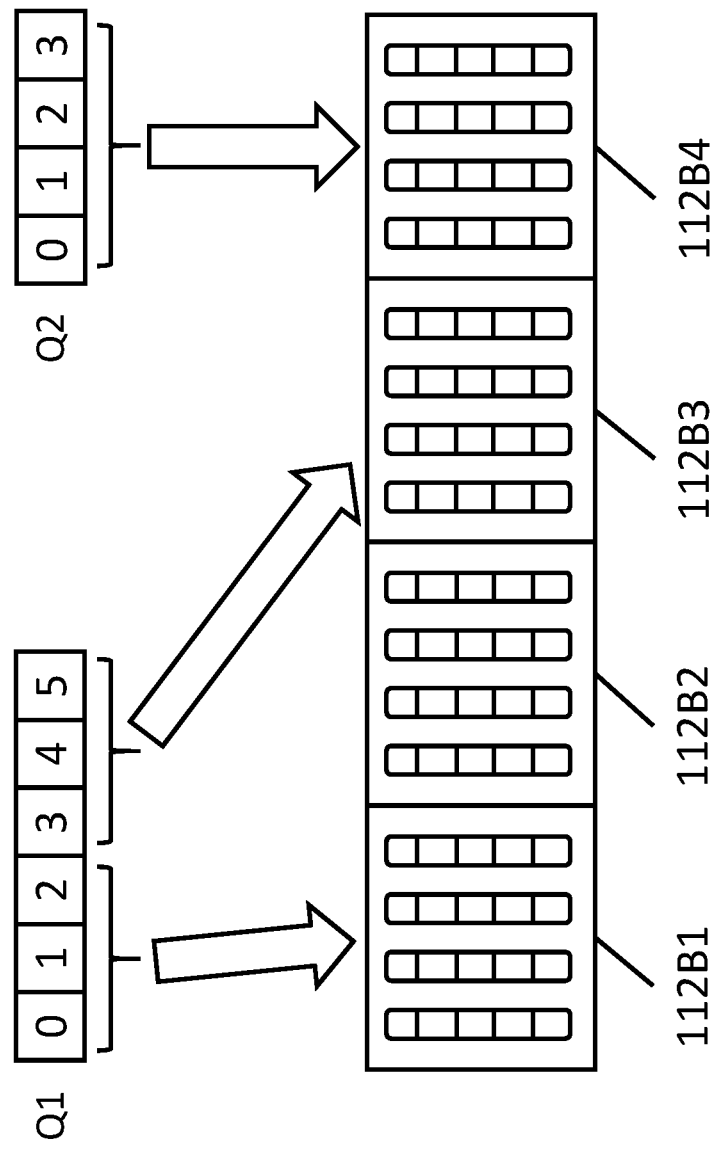
FIG. 6 is a schematic depiction of storing messages in flash blocks based on order of receipt per queue according to one embodiment of the present disclosure.

FIG. 6 is a schematic depiction of storing messages in flash blocks based on order of receipt per queue according to one embodiment of the present disclosure. As shown in FIG. 6, a first queue Q1 includes messages identified as 0 through 5 (numbered in the order in which they were published to the first queue) and a second queue Q2 includes messages identified as 0 through 3 (numbered in the order in which they were published to the second queue). In the embodiment shown in FIG. 6, messages 0, 1, and 2 from first queue Q1 are all stored in a first flash block 112B1. The second flash block 112B2 may be unused in this example (e.g., it may be storing messages from another queue or may be left empty for wear leveling reasons). A third flash block 112B3 stores messages 3, 4, and 5 from first queue Q1, and a fourth flash block 112B4 stores messages 0, 1, 2, and 3 from second queue Q2. As seen in FIG. 6, messages from the first queue Q1 are not intermingled in flash blocks 112B with messages from other queues, such as second queue Q2. In addition, messages are stored in blocks based on their order (e.g., message 4 is not stored, out of order, in first flash block 112B1 with messages 0, 1, and 2 with messages 3 and 5 stored in third flash block 112B3).

Accordingly, when performing garbage collection, after the expiration of message 2 of first queue Q1, messages 0 and 1 must have also expired, having been published earlier and all messages of first queue Q1 having the same message lifetime. Accordingly, first flash block 112B1 can be erased at that time, and there is no remaining valid data in the block that needs to be copied elsewhere. Likewise, when message 5 of first queue Q1 expires, the third flash block 112B3 can be garbage collected, and when message 3 of second Q2 expires, the fourth flash block 112B4 can be garbage collected without the need to copy pages to other flash blocks.

As another example of storing messages based on message lifetimes, a first queue may be configured to have a 30-minute message lifetime for its messages, and a second queue may be configured to have a 5-minute message lifetime for its messages. When identifying, in operation 530, a write physical location for writing a new message targeted to the second queue, the storage controller 120 may determine that there is sufficient space available in the pages of a flash block containing only messages that are expected to expire, approximately 5 minutes from the current time. For example, the flash block may contain mostly messages that were added to the first queue (having a 30-minute message lifetime) approximately 25 minutes ago. Accordingly, the storage controller 120 may identify this particular flash block as a potential write physical location for the message and store the message in a page of that flash block.

In some embodiments, the identification of a write physical location for the message is based on multiple factors identified above (e.g., being based on both wear-leveling considerations and grouping together messages expiring at approximately the same time).

Referring back to FIG. 5, in operation 550, the storage controller 120 stores the message in the identified write physical location, such as within the non-volatile memory 110 in the case where the message is to be persisted. In addition, as noted above, the flash translation logic 124 of the storage controller translates between logical addresses of messages (e.g., each message may be associated with a unique identifier) and implementation specific reads and writes (e.g., based on physical locations within the non-volatile memory 110). In more detail, in some embodiments, the flash translation logic 124 maintains a mapping between message identifiers and particular physical locations within the non-volatile memory.

In operation 570, the storage controller 120 updates the queue state based on the storage of the message. In some embodiments, the storage controller 120 maintains, for each queue, an ordered list (or array) of message identifiers of that are messages on that queue. For example, referring back to FIG. 4B, writing a new message (having a message identifier 5) to a queue (first queue Q1) results in the message being stored in the non-volatile memory, the flash translation logic 124 being updated to associate the message identifier with a physical location (e.g., the selected write physical location), and the message identifier also being added to the tail (or end) of the queue. In some embodiments where a message is added to multiple queues, the same message identifier is added to the ends of two different queues, such that the content of the message is stored only once in the non-volatile memory 110 (e.g., without creating a duplicate copy of the content or payload of the message for each queue on which the message is published). After adding the message to the queue, the storage controller 120 may send an acknowledgement (or "ack") message to the publisher to indicate the successful publishing of the message.

In some embodiments of the present disclosure, the storage controller 120 is further configured to communicate the publishing of a new message on a queue to one or more registered subscribers to the queue. Reading of messages by subscribers through these further communications ("push" communications) or through message read commands sent by subscribers ("pull" communications) will be described in more detail below with respect to FIG. 7.

Figure 7:
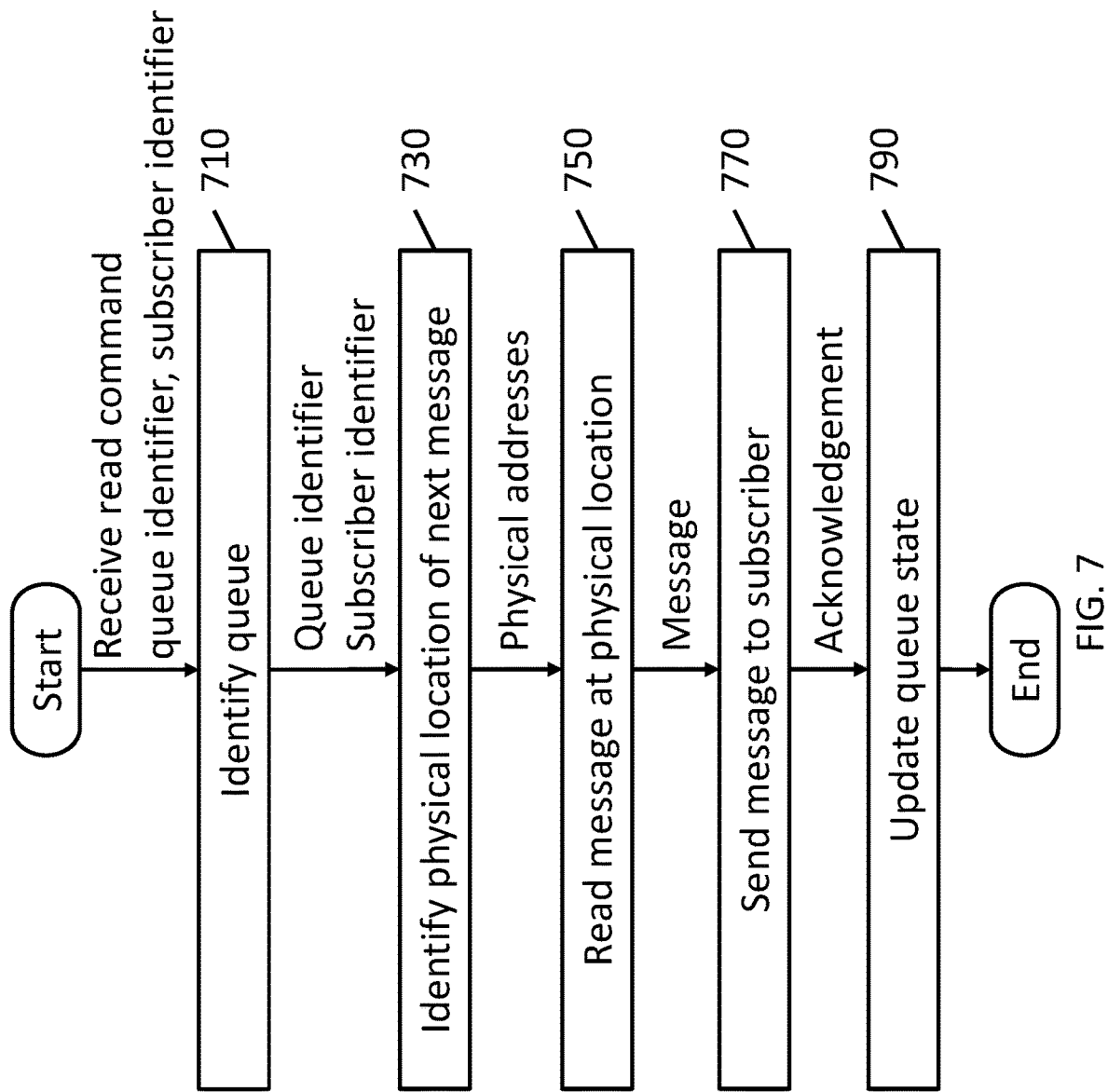
FIG. 7 is a flowchart of a method for processing a message read command from a queue according to one embodiment of the present disclosure.

FIG. 7 is a flowchart of a method for processing a message read command from a read queue according to one embodiment of the present disclosure. A message read command may be received from an external source, such as a host computer system or a network attached computer system, via the data ports 140 or may be generated internally by the storage controller 120. In some embodiments, the message read command includes a queue identifier (e.g., an external queue identifier) and a subscriber identifier. In a manner similar to that described above, in some embodiments of the present disclosure, the subscriber is authenticated prior to further processing the message read command. For example, the message read command may include authentication information associated with the subscriber, such as a one-time password, a digital signature, or a value based on a challenge generated by the storage controller 120.

In operation 710, the storage controller 120 identifies a read queue (e.g., a queue to be read from) based on the queue identifier from the message read command, such as by looking up the internal queue identifier in a manner similar to that performed in operation 510 when processing a message write command. Based on the identified queue and the subscriber identifier from the message read command, in operation 730, the storage controller 120 determines a read physical location of a next message (or multiple read physical locations of multiple next messages) to be sent to the subscriber.

As described above with respect to FIG. 4B, different subscribers to a same queue may receive messages at different time intervals or in accordance with different access patterns. For example, some subscribers may periodically issue message read commands (e.g., "polling") to retrieve the messages that were published since the last message read commands, while some other subscribers may request messages only when those subscribers have processing capacity for processing a next message (e.g., in the case where the queue represents a work queue and each message corresponds to a long-running work unit). As such, in some embodiments of the present disclosure, for each queue, the storage controller 120 maintains a cursor for each subscriber to that queue, where the cursor identifies the next message that has not yet been received by the subscriber (in other words, the head of the queue, from the perspective of the subscriber). In the example shown in FIG. 4B, prior to the read, the cursor for Subscriber X was at message 3, whereas the cursor for Subscriber Y was at message 4. After reading message 3, the cursor for Subscriber X is moved to message 4. Likewise, after reading message 4, the cursor for Subscriber Y is moved to message 5 or the end of the queue (which may be an empty slot until a publisher publishes a message to the queue). In some embodiments of the present disclosure, when all subscribers of a queue have received a given message (e.g., when all cursors on the queue have moved past the given message or are closer to the tail of the queue than the given message), then the given message is marked as expired. In some circumstances, when a message expires based on message lifetime or persistence settings, the position of the cursors may be updated to point to a valid message (e.g., cursors pointing to expired messages are moved toward the tail of the queue, or forward in time, to the next message in the queue that is not expired).

Accordingly, in some embodiments, the storage controller 120 determines a next message to read for the identified subscriber from the identified queue based on the current position of the cursor associated with the identified subscriber. In some embodiments, the message read command may indicate that multiple messages (e.g., a specified number of messages or the maximum number of messages that can fit in a message buffer of a given size) are to be read, in which case the storage controller identifies multiple sequential messages to be read, starting from the cursor position and moving toward the tail of the queue.

In operation 750, the storage controller 120 reads the message located at the physical address of the non-volatile memory 110 identified in operation 730 (or multiple physical addresses in the case of multiple messages). In operation 770, the storage controller 120 sends the retrieved message or messages to the subscriber via the data ports 140 (e.g., over a local NVMe bus or over a computer network). In some embodiments, the subscriber acknowledges receipt of the messages, and in operation 790, the storage controller 120 updates the queue state based on the acknowledgement of the messages, such as by updating the position of the cursor associated with the subscriber to identify the next unread or unsent message in the queue. In some embodiments the storage controller updates the position of the cursor associated with the subscriber without receiving an acknowledgement from the subscriber.

In some embodiments of the present disclosure, message read commands also allow a subscriber to access messages out of order and/or to change the position of the queue. For example, in some embodiments, a "peek" message read command may be used to retrieve the message at the head of the queue (e.g., the message currently identified by the cursor), without updating the position of the cursor. In some embodiments, a message read command may request to read one or more messages meeting particular conditions (e.g., containing particular values in the case of a key-value message or published within a particular time window), without updating the position of the cursor. In some embodiments, a cursor repositioning command may reset the cursor of a subscriber to the earliest message currently stored in the queue (e.g., the earliest message in the data structure for the queue managed by the storage controller 120) or may reposition the cursor to a particular point within the queue.

Accordingly, aspects of embodiments of the present disclosure relate to a message queue storage device including a storage controller configured to manage the efficient storage, distribution and delivery of user messages (data), as well as publisher and subscriber management, and message delivery as per configuration.

Storage Processing Units

Referring to FIG. 1, in some embodiments of the present disclosure, the message queue storage device 100 further includes one or more storage processing units (SPU) 160. The one or more SPUs 160 may be configured to perform additional processing on the messages in response to various events (e.g., publishing a message on a queue, delivering a message from a queue, based on a timer, based on particular conditions being met, etc.). Such processing may include, for example, performing analytics on the messages (e.g., computing statistics based on the data in the messages), detecting conditional events (e.g., particular combinations of messages), generating new messages based on the publishing of particular types of messages (e.g., generating messages that aggregate or summarize data from different messages), and the like. In various embodiments of the present disclosure, a storage processing unit 160 may be implemented using a processing circuit such as a processor and memory, an application specific integrated circuit (ASIC), a field programmable gate array (FPGA), and the like.

In some embodiments of the present disclosure, message processing by an SPU 160 may be configured in association with a queue. For example, in some embodiments, an SPU 160 performs additional processing to every message that is received for a queue, where the particular processing applied to each message is configured as one or more processing rules executed by the SPU 160. For example, in a circumstance where messages published on a queue include information regarding the current processor load (e.g., the current CPU usage percentage) of particular servers, an SPU 160 may be configured to compute a moving average processor load over time across the different servers whose processor loads are being published to the queue.

In some embodiments, the SPU 160 performs additional processing to messages when responding to a message read command from a subscriber, before sending the message to the subscriber. For example, in some embodiments the SPU 160 may be configured to maintain logs regarding the access history of subscribers to queues, such as maintaining a log of message read commands and acknowledgements from the subscriber, compute a read frequency of the subscriber, and the like.

In some embodiments, the SPU 160 may be configured to perform additional processing in the form of modifying messages that are published, before saving the messages to the non-volatile memory, or modifying messages before they are sent to subscribers. For example, in some embodiments, the SPU 160 may add additional timestamps or logs to the message, or append a digital signature to the message to indicate that the message was stored on the message queue storage device 100. In some embodiments, the SPU 160 may tailor a message for a particular subscriber prior to sending the message to the subscriber, such as by redacting or removing portions of the message that should not be provided to the subscriber, or combining the message with other subscriber-specific data (e.g., modifying a time zone of timestamps in the message in accordance with the subscriber's preferred time zone).

In some embodiments, the SPU 160 generates additional messages and queues the generated messages on one or more queues. As one example, and continuing the above example regarding the aggregation of processor load information across multiple processors, the SPU 160 may periodically generate a message to report the aggregated average processor load across the multiple servers and queue those generated messages containing the aggregated data on a queue configured for reporting aggregate information regarding the group of servers.

In some embodiments of the present disclosure, the SPU 160 (and/or the storage controller 120) performs encryption of messages. In some embodiments, messages are encrypted in transit, e.g., to or from the message queue storage device 100. In some embodiments, messages are encrypted at rest, e.g., while stored in the non-volatile memory 110 or in the volatile memory 130. In some embodiments, SPU 160 and/or the storage controller 120 performs the encryption of messages during transit using an encryption protocol such as transport layer security (TLS), or where the message is encrypted using, for example, symmetric encryption keys exchanged using public and private keys.

In embodiments in which the messages are encrypted during transit, the storage controller 120 may store the encrypted messages in the non-volatile memory 110 and/or the volatile memory 130 without first decrypting those messages. However, such an arrangement may prevent further processing of the message by the storage processing unit 160 based on the content of the message. In some embodiments, a homomorphic encryption cryptosystem is used to encrypt the messages during transit. In such embodiments, the storage processing unit 160 may perform further perform processing on the homomorphically encrypted messages.

In some embodiments, the messages are encrypted before being stored on the non-volatile memory 110. For example, messages encrypted during transit may first be decrypted then encrypted (e.g., using a different encryption algorithm or different encryption key) before storage in the non-volatile memory 110. These messages may subsequently be decrypted in response to message read commands, and re-encrypted before being sent to a subscriber.

Queue Groups

Some additional aspects of embodiments of the present disclosure relate to providing queue groups, where a queue group includes multiple queues. A message write or publish command may specify a queue group instead of a single queue and may also specify rules by which the storage controller identifies a queue from the group for the operation. In some embodiments, when performing a message write command, the storage controller 120 may identify a queue from the queue group in operation 510 based on queue selection criteria.

In some embodiments, messages are distributed to queues in a "round-robin" manner, where different queues of the group take turns receiving messages. In some embodiments, messages are distributed to queues based on queue length to try to keep all queues approximately the same length (e.g., each new message is added to the shortest queue of the group).

In some embodiments, messages may be associated with a priority level (e.g., a priority level selected from "low," "medium," and "high" or a numerical priority level) and different queues of the queue group may be associated with these different priority levels. Each message may then be added to the tail of the queue correspond to its priority.

Likewise, in some embodiments, when performing a message read command that specifies a queue group, the storage controller 120 identifies a queue of the queue group based on queue selection criteria. Continuing the above example, in response to a message read command identifying a queue group, the storage controller 120 may first deliver messages from the highest priority queue before delivering messages from lower priority queues, even if these are messages from lower priority queues that were published before the messages in the higher priority queue.

In some embodiments of the present disclosure, a queue group is used to provide quality of service (QoS) functionality for message retention and delivery. In a manner similar to that described above relating to message priority, a queue group may include queues for information of different levels of importance. As one specific example, a queue group may be used to log events generated by software system. Logging operations of a computer system may produce events having different "logging levels" referring to different levels of detail, such as "DEBUG," "INFO," "WARN," "ERROR" and "FATAL." For example, FATAL level information may report very severe error events that may require the application to abort and that may be of higher importance to administrators of those software systems, whereas DEBUG and INFO level information may be highly detailed and may primarily be useful while actively debugging errors in the software system or monitoring some of the details of the operation of the system.

Under normal operating conditions, the rate at which logging messages are generated may be relatively steady and within the capabilities of the system to manage.

However, under some conditions, such as the presence of a bug, a runaway condition, or during an attack (e.g., denial of service attack), events may be generated at a higher rate than can be stored by a message queue storage device 100 according to embodiments of the present disclosure. For example, messages may be published more quickly than they are read by subscribers, and may fill the storage capacity of the non-volatile memory 110.

Accordingly, some aspects of embodiments of the present disclosure relate to maintaining some quality of service by dropping lower priority messages in order to maintain responsiveness or in order to preserve message persistence and durable delivery of higher priority messages. For example, lower priority messages may be dropped, decimated, aggregated, or otherwise compressed to reduce storage requirements. In some embodiments, some aspects of the quality of service processing is performed by the storage processing unit 160.

In some embodiments of the present disclosure, the storage controller 120 and/or the storage processing unit 160 is configured to move and/or reorder messages between the queues managed by the storage controller 120. As noted above, the order of messages and the states of the queues are managed by the storage controller 120, and therefore, in some embodiments, messages may be moved between queues by moving the message identifiers in the queues without requiring the movement of the messages stored in the non-volatile memory 110.

In some embodiment of the present disclosure, the storage controller 120 and/or the storage processing unit 160 move or reorder messages in the queues to perform dynamic rebalancing of the queues to provide improved quality of service (QoS) under various conditions (e.g., high load at the message queue storage device 100). For example, in some embodiments, when a particular queue grows long (e.g., having more than a threshold number of messages), the storage controller 120 may move one or more messages from the long queue to other, shorter queues. For example, this approach may be used for automatic scaling of computational resources, where a long queue indicates that current subscribers to the long queue do not have sufficient computational power to keep up with the rate at which new messages are added to the queue. By moving messages to another queue with different subscribers (serving as overload support), the additional subscribers can assist in dealing with the current high volume of messages, thereby continuing to provide high quality of service by processing the messages that are already queued, rather than dropping messages.

As another example, in some embodiments of the present disclosure messages are reordered within the queues to improve the quality of service. For example, in some embodiments, messages of different priority may be mixed in the same queue, and, under normal operating conditions, processed in order of publishing without regard to priority. However, under conditions where the queue is long (e.g., there are many messages in the queue), higher priority messages may be moved toward the head of the queue such that they are read by (or delivered to) subscribers before lower priority messages.

Various components of message queue storage devices according to various embodiments of the present disclosure, such as the storage controller 120 and the storage processing unit 160 may be implemented using one or more processing circuits. Examples of processing circuits include a processor and memory storing instructions that configured the processor to perform various operations, an application specific integrated circuit (ASIC), a field programmable gate array (FPGA), a digital signal processor (DSP), and the like.

Any of the components or any combination of the components described (e.g., in the system diagrams) can be used to perform one or more of the operations of the flow charts. Further, the operations are example operations, and may involve various additional operations not explicitly illustrated in the flowcharts. Furthermore, the temporal order of the operations may be varied without departing from the spirit and scope of embodiments of the present disclosure.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A message queue storage device comprising:
a non-volatile flash memory unit comprising one or more flash memory dies comprising a first page of a first flash block and a second page of a second flash block;
a volatile memory;
a data port; and
a storage controller configured to:
receive, via the data port, a message write command comprising a message and a queue identifier;
identify a queue from one or more queues based on the queue identifier;
determine that the message is a persistent message;
select, based on a configuration parameter, a write physical location from among a first write physical location in the first flash block and a second write physical location in the second flash block of the flash memory dies in which to store the message; and
store the message associated with the queue at the write physical location in the one or more flash memory dies of the non-volatile flash memory unit.

2. The message queue storage device of claim 1, further comprising a storage processing unit configured to perform computations based on the message.

3. The message queue storage device of claim 1, wherein the data port is a component of a network adapter.

4. The message queue storage device of claim 1, wherein the queue has a message lifetime that is applied to messages associated with the queue, and
wherein the storage controller is configured to compute an expiration time for the message in the queue.

5. The message queue storage device of claim 4, wherein the storage controller is configured to select the write physical location of the flash memory dies based on an expiration time of a second message stored in a same flash block as the write physical location.

6. The message queue storage device of claim 1, wherein the storage controller is further configured to perform garbage collection on a flash block based on determining that all messages stored in the flash block are marked as expired.

7. The message queue storage device of claim 1,
wherein the message write command comprises a publisher identifier, and
wherein the storage controller is further configured to authenticate a publisher associated with the publisher identifier.

8. The message queue storage device of claim 1, wherein the storage controller is further configured to:
receive a request to subscribe to the queue; and
add a subscriber to the queue.

9. The message queue storage device of claim 8,
wherein the request comprises a subscriber identifier, and
wherein the storage controller is further configured to authenticate a subscriber associated with the subscriber identifier.

10. The message queue storage device of claim 8, wherein the storage controller is further configured to, send an alert to the subscriber in response to adding the message to the queue.

11. The message queue storage device of claim 8, wherein the storage controller is further configured to send the message to the subscriber in response to adding the message to the queue.

12. A message queue storage device comprising:
a non-volatile flash memory unit comprising one or more flash memory dies comprising one or more pages grouped into one or more flash blocks;
a volatile memory;
a data port; and
a storage controller configured to:
receive, via the data port, a message write command comprising a message and a queue identifier;
identify a queue from one or more queues based on the queue identifier;
determine that the message is a persistent message;
select a write physical location in one or more pages of the flash memory dies in which to store the message; and
store the message associated with the queue at the write physical location in the one or more pages of the non-volatile flash memory unit,
wherein the storage controller is further configured to:
receive a request to subscribe to the queue; and
add a subscriber to the queue, wherein the storage controller is further configured to send an alert to the subscriber in response to adding the message to the queue, and wherein the storage controller is configured to:
- receive a message read command comprising a queue identifier and subscriber identifier;
- identify a read queue from the one or more queues based on the queue identifier;
- identify a read physical location of a next message in the read queue;
- read a stored message at the read physical location in the pages of the flash memory dies; and
- send the stored message to a subscriber associated with the subscriber identifier.

13. The message queue storage device of claim 12, wherein the storage controller maintains a cursor associated with the subscriber identifier and the queue.

14. The message queue storage device of claim 13, wherein the storage controller is configured to identify the read physical location of a next message in the queue by:
- determining a current position of the cursor associated with the subscriber identifier;
- determining a message identifier associated with the current position of the cursor; and
- determining the read physical location based on the message identifier.

15. The message queue storage device of claim 13, wherein the storage controller is further configured to:
- receive an acknowledgement from the subscriber; and
- update a position of the cursor in the queue based on the acknowledgement from the subscriber.

16. The message queue storage device of claim 13, wherein the storage controller is further configured to mark a message as expired in response to determining that all cursors have moved past the message.

17. The message queue storage device of claim 1, wherein the storage controller provides a Non-Volatile Memory express (NVMe) interface for controlling the message queue storage device via the data port.

18. An interface for a flash storage controller comprising a flash translation logic configured to translate from a queue identifier and a message to a physical location in flash memory, the interface providing:
- a message write command comprising a first queue identifier and a first message, the message write command controlling the flash storage controller to store the first message, associated with a first queue identified by the first queue identifier, in the flash memory; and
- a message read command comprising a second queue identifier and a subscriber identifier, the message read command controlling the flash storage controller to read a second message stored in the flash memory and associated with a second queue identified by the second queue identifier and a position in the second queue associated with the subscriber identifier.

19. The interface for the flash storage controller of claim 18, wherein the interface further provides a create queue command to control the flash storage controller to create a third queue for providing access to messages published to the third queue in a first-in-first-out order.

20. The interface for the flash storage controller of claim 19, wherein the create queue command configures the flash storage controller to:
- assign a message lifetime to a third message published to the third queue; and
- mark the third message as expired based on the message lifetime of the third message.

21. The interface for the flash storage controller of claim 18, wherein the interface further provides a subscribe command comprising a fourth queue identifier and a subscriber identifier, the subscribe command controlling the flash storage controller to subscribe the subscriber identifier to a fourth queue associated with the fourth queue identifier.

* * * * *